United States Patent Office 3,440,248
Patented Apr. 22, 1969

3,440,248
N-(CARBOXY HYDROCARBON) - 1,2,3,4,9,9-HEXA-CHLORO - 1,4,4a,5,6,7,8,8a - OCTAHYDRO - 1,4-METHANONAPHTHALENE - 6,7 - DICARBOX-IMIDES
Carleton W. Roberts, Midland, and Gale D. Travis, Shephard, Mich., assignors to The Dow Chemical Company, Midland, Mich., a corporation of Delaware
No Drawing. Filed Feb. 23, 1965, Ser. No. 434,709
Int. Cl. C07d 29/24, 27/52; A01n 9/02
U.S. Cl. 260—326
8 Claims

ABSTRACT OF THE DISCLOSURE

Substituted 1,2,3,4,9,9 - hexachloro - 1,4,4a,5-6,7,8,8a-octahydro-1,4-methanonaphthalene - 6,7 - dicarboximides particularly such imides having an N(monocarboxylower-alkyl), N(dicarboxyloweralkyl) or N(phenylmonocar-boxyloweralkyl) substituent are novel compounds useful as parasiticides for the control of insects, bacteria, fungi and higher plants.

---

The present invention is directed to organic chemistry and is directed, in particular, to a chlorinated methano-naphthalene compound selected from the group consisting of product of Formula A Formula A

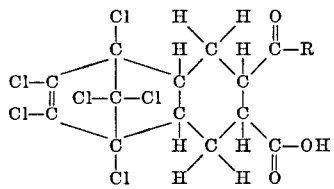

the alkali metal salt of Formula A; the alkaline earth metal salt of Formula A; the HR salt of Formula A; product of Formula B Formula B

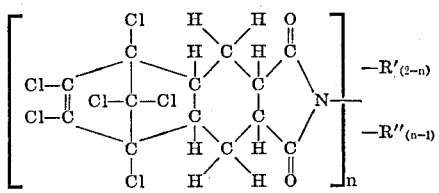

and 1,2,3,4,9,9 - hexachloro - 1,4,4a,5,6,7,8,8a-octahydro-1,4-methanonaphthalene-6,7-dicarboximide. In the above and succeeding formulae, R represents a member selected from the group consisting of —NHR′, —NH-R″—NH₂, piperidino, substituted piperidino, morpholino, substituted morpholino, 1-pyrrolidinyl, and substituted 1-pyrrolidinyl; R′ represents a member selected from the group consisting of alkyl, monocarboxyloweralkyl, dicarboxylower-alkyl, phenylmonocarboxyloweralkyl, cyclohexyl, phenyl, substituted phenyl, anilino, substituted anilino, di-n-lower-alkylaminohigheralkyl, di - sec - loweralkylaminohigher-alkyl, pyridyl, 1H-tetrazol-5-yl, 2-loweralkyltetrazol-5-yl, and thiazolyl; R″ represents a member selected from the group consisting of phenylene, alkylene, and radical of the formula

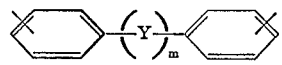

wherein Y represents a radical selected from the group consisting of —O—, —S—, straight-chain alkylene, and dimethylmethylene; and m represents an integer of from 0 to 1, both inclusive; and n represents an integer of from 1 to 2, both inclusive.

The products of the present invention are liquid or solid materials of low to moderate solubility in organic solvents, and of varying solubility in water. Those products which are alkali metal salts, alkaline earth metal salts, or HR salts of Formula A are of moderate solubility in water, whereas the remaining products of the present invention are of low solubility in water.

In the present specification and claims, the term "alkyl" is employed to designate alkyl radicals being of from 1 to 10, both inclusive, carbon atoms; the term "lower-alkyl" is employed to designate alkyl radicals being of from 1 to 5, both inclusive, carbon atoms; and the terms "higheralkyl" and "alkylene" are employed to designate alkyl and alkylene radicals, respectively, being of from 2 to 12, both inclusive, carbon atoms. As employed in the present specification and claims, the term "straight-chain alkylene" is employed to refer to a radical of the formula $-(CH_2)_p-$ wherein p represents an integer of from 1 to 12, both inclusive. In the present specification and claims, the terms "substituted phenyl" and "substituted anilino" are employed to refer to phenyl and anilino radicals, respectively, each of which bears, nuclearly substituted upon the phenyl portion thereof, from 1 to 2 substituents, each of which is independently selected from the group consisting of bromo, chloro, and nitro; and the terms "substituted piperidino," "substituted morpholino," and "sub-stiuted 1-pyrrolidinyl" are employed to refer to piperidino, morpholino, and 1-pyrrolidinyl radicals, respectively, each of which bears from 1 to 2 substituents, each of which is independently selected from the group consisting of methyl and ethyl. Further, as employed in the present specification and claims, the term "alkali metal" designates appearances of lithium, sodium, and potassium, only; and the term "alkaline earth metal" designates appearances of magnesium, calcium, strontium, and barium, only.

The products of the present invention which are of Formula A, the HR salts of Formula A (hereinbelow shown as Formula C), and the products of Formula B, are prepared in a reaction sequence comprising several individual reactions. The reaction sequence is believed to proceed in accordance with the following partial equation:

(anhydride reactant)

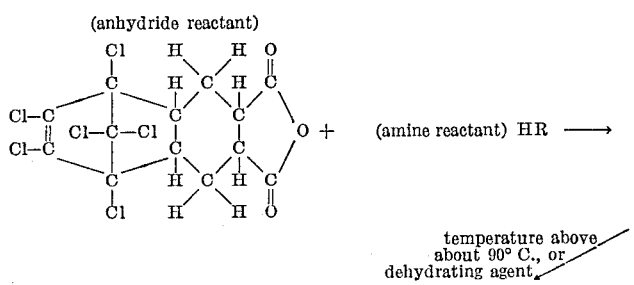

(amine reactant) HR ⟶ temperature above about 90° C., or dehydrating agent

Formula A

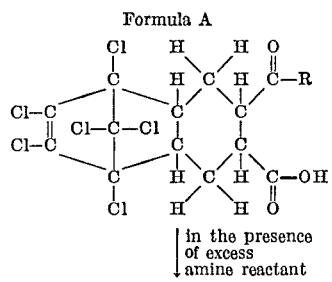

in the presence of excess amine reactant

Formula B

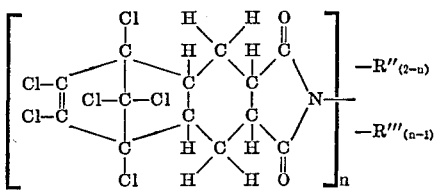

⇄ temperature of above about 90° C., dehydrating agent, acid conditions

Formula C
(HR salts of Formula A)

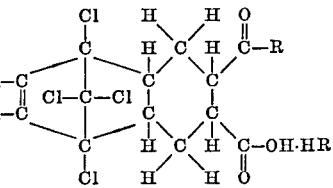

The remaining products of the present invention, i.e., the alkali metal and alkaline earth metal salts of Formula A and 1,2,3,4,9,9 - hexachloro - 1,4-,4a, 5,6,7,8,8a - octahydro - 1,4 - methanonaphthalene-6,7-dicarboximide, are prepared in other methods set forth hereinbelow.

Thus, in one embodiment, the present invention is directed to amic acid products of Formula A:

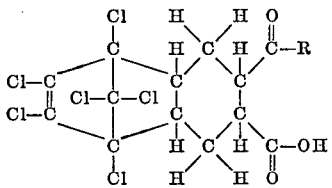

and to their alkali metal and alkaline earth metal salts. The amic acid products are prepared by the reaction together, as the first reaction of the reaction sequence, of an amine reactant of the formula HR with 1,2,3,4,9,9-hexachloro - 1,4,4a,5,6,7,8,8a - octahydro - 1,4-methanonaphthalene-6,7-dicarboxylic anhydride, which has the structural formula

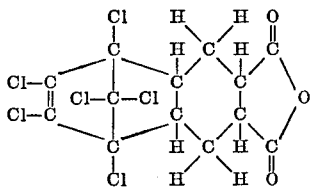

and which is referred to throughout the present specification and claims by the term "anhydride reactant."

In another embodiment, the present invention is directed to intermolecular salt products which are HR salts of the products of Formula A. These intermolecular salt products are of the following formula Formula C

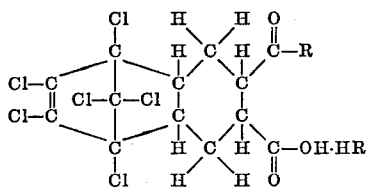

These products of Formula C are prepared by the reaction together of a reactant of the formula HR and product of Formula A. Most conveniently, however, these products of Formula C are prepared by reacting the anhydride reactant and the amine reactant, both reactants as previously defined, in the general reaction sequence set forth above, and, by modification of the reaction conditions, carrying the reaction sequence beyond the preparation of product of Formula A to the preparation of the desired product of Formula C.

In yet another embodiment, the present invention is directed to the imide products of Formula B

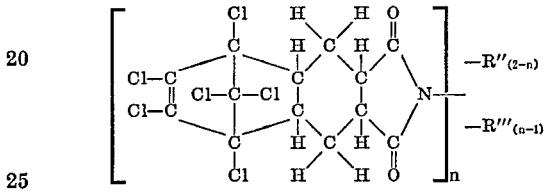

These products are prepared in any of various known procedures for ring-formation, from products either of Formula A or from their HR salts. Such procedures for ring-formation include thermal dehydration (by subjection to temperatures in excess of about 90° C.), dehydration by contact with a chemical dehydrating agent, such as acetic anhydride and, in the instance of the HR salt, subjection to acid conditions. Most conveniently, however, these products of Formula B are prepared by reacting the anhydride reactant and the amine reactant, both reactants as previously defined, in the general reaction sequence as set forth above, and, by modification of the reaction conditions, carrying the reaction sequence beyond the preparation of product either of Formula A or of the HR salt of Formula A.

Thus, the reaction sequence comprising the reaction of anhydride reactant and amine reactant can be employed, by modification of the reaction conditions, to prepare products of Formula A, HR salts of Formula A, or products of Formula B. However, the final step of the reaction sequence, i.e., the reaction to prepare imide products, is not available in the instance of those products of Formula A wherein R represents piperidino, substituted piperidino, morpholino, substituted morpholino, 1-pyrrolidinyl, or substituted 1-pyrrolidinyl, that is, compounds of the formula Formula D

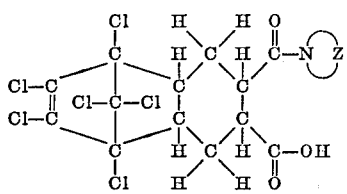

In the embodiment of the present invention, which embodiment is represented by products of this formula, the moiety Z is a divalent radical which, with the nitrogen atom to which it is bonded, constitutes a radical selected from the group consisting of piperidino, substituted piperidino, morpholino, substituted morpholino, 1-pyrrolidinyl, and substituted 1-pyrrolidinyl. In the products of Formula D, unlike the remaining products of Formula A, the nitrogen atom of the amide functional group is a tertiary nitrogen atom, and therefore, this product cannot proceed further in the reaction sequence.

The reaction of anhydride reactant and amine reactant is in all instances conveniently carried out in the presence of an inert liquid as a reaction medium. The employment of such medium, or the identity of the inert liquid employed, is not critical; however, the use of the medium provides for the dispersion and contacting of the reactants, and is preferred. Representative inert liquids include hydrocarbons, such as benzene, hexane, and toluene; chlorinated hydrocarbons, such as dichloromethane; ethers; ketones, such as acetone; and N,N-disubstituted amides, such as dimethylformamide. Preferably, acetone or dimethylformamide is employed as inert liquid reaction medium.

The reaction of the anhydride reactant and the amine reactant goes forward at temperautres over a wide range, for example, from 0° to 200° C. The use of temperatures in excess of about 90° C. results in the predominant preparation of product of the Formula B; and, when product of Formula A or its HR salt is to be prepared, it is necessary to avoid temperatures in excess of about 90° C. Preferably, in preparing product of Formula A or its HR salt, room temperatures are employed. The reaction goes forward under atmospheric pressures of a wide range; however, no advantage ordinarily results from the use of subatmospheric or superatmospheric pressures, and, therefore, the preparation is ordinarily carried out at atmospheric pressures.

The amounts of the reactants to be employed are not critical, some of the desired product of Formula A, its HR salt, or product of Formula B resulting when the reactants are employed in any amounts. In the preparation of product of Formula A, the reactants are consumed in amounts which represent equimolecular proportions. Thus, when it is dseired to prepare product of Formula A in good yield, it is usually preferred to supply the anhydride reactant and the amine reactant in amounts representing equimolecular proportions. When the amine reactant is present in an amount representing a molecular proportion numerically greater than the molecular proportion represented by the anhydride reactant, the reaction sequence proceeds beyond the first reaction to prepare product of Formula B or sometimes, depending upon amounts involved, to prepare mixtures of product of Formula A and its HR salts. However, when the amine reactant is present in such excess amount, and the reaction sequence as a consequence proceeds with the preparation of the HR salt product, the HR salt moiety of this product can usually be driven off as free amine, as, for example, by refluxing the reaction mixture (at a temperature below about 90° C. to prevent imide formation). Sometimes, therefore, in preparing product of Formula A, it is preferred to use an excess of amine reactant, and, during the course of the reaction, to drive off the HR salt moiety, in order to obtain the product of Formula A in good yield.

In the reaction to prepare product of Formula C (the HR salts of Formula A), the reactants are consumed in amounts which represent one molecular proportion of anhydride reactant, and two molecular proportions of amine reactant. The supplying of the reactants in amounts representing such proportions consumed in the preparation of product of Formula C, or an excess of amine reactant, is preferred.

In preparing a product of Formula B, employing an amine reactant which permits of carrying out the final reaction of the reaction sequence, the reaction also, as in the preparation of product of Formula A, consumes the reactants in amounts representing equimolecular proportions in the instance when $n=1$; in the instance wherein $n=2$, the reaction consumes the reactants in amounts representing one molecular proportion of amine reactant and two molecular proportions of anhydride reactant. In either instance, the use of the reactants in amounts representing such proportions as are consumed by the reaction is preferred.

Thus, in the employment of the reaction sequence to prepare a product of Formula A, equimolecular proportions of the reactants are supplied, the reaction is carried out at all times at temperatures below about 90° C., preferably at room temperatures, and the reaction as well as subsequent separatory and purification procedures are carried out in the absence of any dehydrating agent. In the employment of the reaction sequence to prepare HR salts of Formula A, one molecular proportion of anhydride reactant and two molecular proportions of amine reactant are supplied, the reaction is carried out at all times at temperatures below about 90° C., preferably at room temperatures, and the reaction as well as subsequent separatory and purification procedures are carried out in the absence of any dehydrating agent. Finally, in the employment of the reaction sequence to prepare, where the identity of the amine reactant perimts of it, a product of Formula B, equimolecular proportions of the reactants are supplied and reaction is conducted at least for a portion of time at temperatures in excess of about 90° C., such as at temperatures of from 90° to 250° C. Alternate methods for preparing product of Formula B or of Formula C, including modifications of the reaction sequence, are discussed hereinbelow.

In carrying out this reaction sequence to prepare product of Formula A its HR salt, or product of Formula C, the reactants are contacted together, conveniently by adding one reactant to the other reactant. The reaction ordinarily goes forward rapidly, with the preparation of the desired product in the reaction mixture and in good yield. Sometimes it is preferred to permit the reaction mixture to stand for a period of time, in order to assure completion of the reaction. Following the completion of the reaction, or when the reactants have been contacted for as long a period of time as it is desired, the product-containing reaction mixture can be employed for the useful purposes of the present invention. Alternatively, the product can be separated from the reaction mixture by conventional separation procedures, such as, for example, filtration, decantation, evaporation under subatmospheric pressure of the inert liquid reaction medium, and the like.

The separated product can be employed for the useful purposes of the present invention, or can be purified by conventional procedures before being so employed. Representative purification procedures include washing with an appropriate liquid which is a solvent for impurities but not for the product; recrystallization and the like.

When the separated product, or the separated and purified product, is of Formula A, such product can be separately employed to prepare alkali metal salt of Formula A, alkaline earth metal salt of Formula A, HR salt of Formula A, or, when the identity of R permits, product of Formula B. In the instance of the last two of these named products, the reaction is carried out in accordance with the teachings hereinabove concerning the general reaction sequence. Thus, in the instance of HR salts of Formula A, the corresponding product of Formula A is reacted with the amine reactant previously employed in the reaction to prepare the said corresponding product of Formula A, the reaction being conducted at temperatures below about 90° C. and in the absence of any dehydrating agent. In the instance of product of Formula B, the corresponding product of Formula A is subjected to temperatures of from about 90° to 200° C., or to the effect of a dehydrating agent, for example, a loweralkanoic acid anhydride such as acetic anhydride. In these preparations of HR salts of Formula A, or, when the identity of R permits, products of Formula B, from a separated product of Formula A, the reaction conditions as set forth hereinabove for the general reaction sequence are employed.

In preparing the alkali metal and alkaline earth metal salts of Formula A from a separated product of Formula A, the separated product is reacted with a base reactant comprising an alkali metal or alkaline earth metal cation. The base reactant can be, for example, a hydroxide, oxide, or carbonate, such as sodium hydroxide; calcium carbonate; potassium hydroxide; magnesium hydroxide; lithium strontium carbonate; or barium oxide.

The reaction is conveniently carried out in an inert liquid as reaction medium. Suitable liquids include water and aqueous alcohols, such as aqueous ethanol and aqueous methanol. The reaction goes forward under temperatures of a wide range, for example, from 0° to 100° C., and preferably from 60° to 80° C. The reaction consumes the reactants in amounts representing equimolecular proportions in the instance of the alkali metal salts, and in amounts representing one molecular proportion of base reactant and two molecular proportions of product of Formula A, in the instance of the alkaline earth metal salts. The use of such proportions is preferred.

In carrying out the reaction, the separated product of Formula A and the base reactant are contacted together in any fashion, conveniently by adding one reactant to the other reactant. The reaction goes forward rapidly, with the preparation of the desired product and of water as by-product.

All of the resulting alkali metal salt and alkaline earth metal salt products are solid materials at room temperatures and atmospheric pressures. Therefore, separation of the salt products is usually preferably accomplished by filtration. Purification of the separated product, if desired, is carried out in conventional procedures.

When the HR salt of Formula A is prepared in accordance with the reaction sequence set forth above and thereafter separated, the separated HR salt can be separately employed to prepare the imide product of Formula B, by subjecting the HR salt to temperatures in excess of about 90° C., or by reacting the HR salt with a dehydrating agent. In other procedures for accomplishing the conversion of HR salt to product of Formula B, the HR salt product is acidified, preferably in an inert liquid as reaction medium, to obtain the desired corresponding imide product. The acidic reactant, for example, can be a mineral acid, such as hydrochloric acid, or a loweralkanoic acid, such as formic acid or acetic acid. The reaction goes forward at temperatures within a wide range, such as from 0° to 200° C., with the production of the desired product of Formula B and of by-product water and the HR salt of the acidifying material.

In yet another embodiment, the present invention is directed to 1,2,3,4,9,9 - hexachloro - 1,4,4a,5,6,7,8,8a-octahydro - 1,4 - methanonaphthalene-6,7-dicarboximide. This compound has the following structural formula

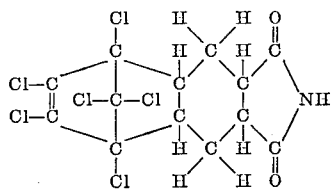

This compound is prepared by the reaction together of the anhydride reactant, as previously defined, and ammonium carbonate or ammonium carbonate hydrate. The reaction goes forward under temperatures over a wide range, such as from 0° to 200° C. and is conveniently conducted in an organic liquid which serves as inert liquid reaction medium. Preferably, dimethylformamide is employed as inert liquid reaction medium. The reaction results in the preparation of the desired product and in the preparation of water and carbon dioxide as by-products.

Some of the desired product is prepared when employing the reactants in any amounts; however, the reaction consumes the reactants in amounts representing equimolecular proportions, and the use of the reactants in such amounts is preferred. The reaction is carried out by contacting the reactants, conveniently by adding one reactant to the other. Thereafter, the resulting reaction mixture can be maintained for a period of time to insure completion of the reaction. The product, which is a solid material, is obtained as a precipitate by adding to the reaction mixture a liquid, conveniently water, miscible with the dimethylformamide but not a solvent for the product. The precipitated product can then be separated by filtration.

In the products of Formula A

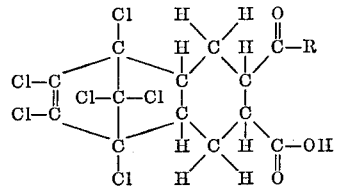

the symbol R, as defined, always represents a nitrogen containing radical whereof the nitrogen atom is directly bonded to the carbonyl, forming an amide functional group. In those products of Formula A wherein the radical represented by the symbol R contains a second nitrogen atom in addition to the amide-forming nitrogen atom, that is, where R represents either (1) —NHR', R' being anilino, substituted anilino, di-n-loweralkylaminohigheralkyl, or di-sec-loweralkylaminohigheralkyl; or (2)

such product of Formula A frequently exists in the zwitterion form, that is, as an intramolecular salt having the partial structural formula:

Formula E 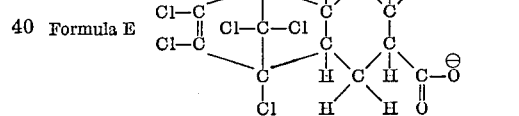

The existence of a given product in this form can be ascertained by known analytical procedures, such as infrared spectroscopy. However, regardless of whether a given product of Formula A exists in the amic acid form of Formula A or in the intramolecular salt form of Formula E, all products of Formula A are prepared by the same procedures as set forth herein, and exhibit the same pattern of properties.

The following examples illustrate the products of the present invention and will enable those skilled in the art to practice the present invention.

EXAMPLE 1

7-(isobutylcarbamoyl) - 1,2,3,4,9,9-hexachloro-1,4,4a,5,6,7,8,8a - octahydro-1,4-methanonaphthalene-6-carboxylic acid A mixture of 42.4 grams of 1,2,3,4,9,9-hexachloro-1,4,4a,5,6,7,8,8a-octahydro-1,4-methanonaphthalene - 6,7-dicarboxylic anhydride (0.1 mole) in 250 milliliters of acetone is heated to a temperature of 25° C. To the resulting heated mixture, 14.64 grams of isobutylamine (0.2 mole) is added over a period of 30 minutes to form a reaction mixture. The reaction mixture is subsequently stirred for a 30-minute period at 25° C. Thereafter, the reaction mixture is heated to reflux temperature, refluxed for 1 hour, cooled to a temperature of about 0° C., and maintained at that temperature for a period of about 2 hours to obtain the 7-(isobutylcarbamoyl)-1,2,3,4,9,9- hexachloro - 1,4,4a,5,6,7,8,8a - octahydro - 1,4 - methanonaphthalene-6-carboxylic acid, as a solid residue in the reaction mixture. The product residue is separated by suction filtration, washed with 50 milliliters of acetone, and dried by evaporation under subatmospheric pressure for a period of about 24 hours. In a representative preparation, the product was found to melt at 188–189° C.; the structure was confirmed by elemental analysis and by infrared spectroscopy.

EXAMPLE 2

N-isobutyl-1,2,3,4,9,9-hexachloro-1,4,4a,5,6,7,8,8a-octahydro-1,4-methanonaphthalene-6,7-dicarboximide A mixture of 1,2,3,4,9,9 - hexachloro-1,4,4a,5,6,7,8,8a-octahydro-1,4-methanonaphthalene-6,7-dicarboxylic anhydride (21.2 grams; 0.05 mole) in 100 milliliters of acetone is heated to a temperature of 30° C., and maintained thereat while 7.32 grams of isobutylamine (0.1 mole) are added portionwise to the heated mixture over a period of 1 hour, to prepare a reaction mixture containing 7-(isobutylcarbamoyl)-1,2,3,4,9,9-hexachloro - 1,4,4a,5,6,7,8,8a-octahydro-1,4 - methanonaphthalene-6-carboxylic acid salt with isobutylamine (molecular weight of 571.2). The resulting reaction mixture is permitted to stand for 16 hours at 25° C. and thereafter treated with 500 milliliters of an aqueous solution containing 12.0 grams of acetic acid (0.2 mole) to prepare the corresponding imide product, N-isobutyl-1,2,3,4,9,9-hexachloro-1,4,4a,5,6,7,8,8a-octahydro-1,4-methanonaphthalene - 6,7-dicarboximide, as a residue. The imide product residue is separated by filtration, washed with three 100 milliliter portions of water, and dried at 85° C. under subatmospheric pressure for 16 hours.

In a representative preparation, N-isobutyl-1,2,3,4,9,9-hexachloro-1,4,4a,5,6,7,8,8a - octahydro - 1,4 - methanonaphthalene-6,7-dicarboximide was found to melt at 167.5–169° C. Elemental analysis showed: C, 42.42 percent; H, 3.55 percent; N, 2.80 percent; and Cl, 44.30 percent; calculated for $C_{17}H_{17}Cl_6NO_2$, C, 42.53 percent; H, 3.57 percent; N, 2.92 percent; and Cl, 44.30 percent.

EXAMPLE 3

7-(morpholinocarbonyl)-1,2,3,4,9,9 - hexachloro-1,4,4a,5,6,7,8,8a-octahydro-1,4-methanonaphthalene - 6 - carboxylic acid 1,2,3,4,9,9-hexachloro-1,4,4a,5,6,7,8,8a - octahydro-1,4-methanonaphthalene-6,7-dicarboxylic anhydride (42.5 grams; 0.1 mole) and morpholine (8.71 grams; 0.1 mole) are mixed together in 50 milliliters of dimethylformamide at room temperature to prepare a reaction mixture. The reaction mixture is held at room temperature for 15 minutes, during which an exotherm is noted. Thereafter, the reaction mixture is heated to reflux temperature and held thereat for a period of 16 hours.

The heated reaction mixture is cooled to room temperature and diluted with 400 milliliters of ice and water at a temperature of about 0° C., to obtain the 7-(morpholinocarbonyl)-1,2,3,4,9,9 - hexachloro - 1,4,4a,5,6,7,8,8a - octahydro-1,4-methanonaphthalene-6-carboxylic acid product as a precipitate in the reaction mixture. The diluted mixture is permitted to stand for 16 hours; and the product residue thereafter separated from the mixture by filtration. The filtered product is washed with 100 milliliters of cold water and dried by being held under subatmospheric pressure at a temperature of 100° C. for 24 hours. The dried product is recrystallized from toluene.

In a representative preparation, the 7-(morpholinocarbonyl)-1,2,3,4,9,9 - hexachloro - 1,4,4a-5-6,7,8,8a-octahydro-1,4-methanonaphthalene - 6 - carboxylic acid was found to melt at 206–209° C. Elemental analysis showed: C, 39.2 percent; H, 3.32 percent; N, 2.81 percent; and Cl, 44.64 percent; calculated for $C_{17}H_{17}Cl_6NO_4$, C, 39.87 percent; H, 3.34 percent; N, 2.73 percent; and Cl, 41.54 percent.

EXAMPLE 4

Sodium 7-(morpholinocarbonyl)-1,2,3,4,9,9 - hexachloro-1,4,4a,5,6,7,8,8a - octahydro-1,4-methanonaphthalene-6-carboxylate 7-(morpholinocarbonyl)-1,2,3,4,9,9-hexachloro - 1,4,4a,5,6,7,8,8a - octahydro-1,4-methanonaphthalene-8-carboxylic acid (25.6 grams; 0.5 mole) is mixed with sodium hydroxide (2.0 grams; 0.5 mole) in 50 milliliters of water to prepare a reaction mixture. This reaction mixture is held at room temperature for a period of about 1 hour to obtain the sodium 7-(morpholinocarbonyl)-1,2,3,4,9,9-hexachloro - 1,4,4a,5,6,7,8,8a - octahydro-1,4-methanonaphthalene-6-carboxylate product in the reaction mixture. This product has a molecular weight of 534.0 and the following structural formula

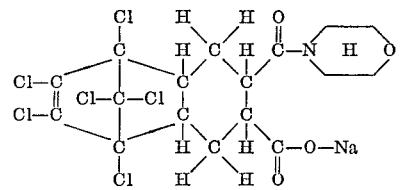

EXAMPLE 5

N,N'-(methylenedi - p - phenylene)bis(1,2,3,4,9,9-hexachloro - 1,4,4a,5,6,7,8,8a-octahydro-1,4-methanonaphthalene-6,7-dicarboximide)

1,2,3,4,9,9-hexachloro-1,4,4a,5,6,7,8,8a-octahydro - 1,4-methanonaphthalene-6,7-dicarboxylic anhydride (42.4 grams; 0.1 mole), p,p'-methylenedianiline (9.91 grams; 0.05 mole), and 100 milliliters of dimethylformamide are mixed together to prepare a reaction mixture. The reaction mixture is heated to a reflux temperature range of about 152–153° C., and found to be a clear solution. The heated reaction mixture is maintained at reflux temperature for 4 hours, cooled to room temperature and the cooled mixture mixed further with 800 milliliters of ice and water at a temperature of 0° C., to obtain the N,N'-(methylenedi - p - phenylene)bis(1,2,3,4,9,9-hexachloro - 1,4,4a,5,6,7,8,8a-octahydro-1,4-methanonaphthalene-6,7-dicarboximide) product as a residue in the reaction mixture. The reaction mixture is permitted to stand for 16 hours and the product residue thereafter separated from the reaction mixture by filtration under suction. The separated product residue is washed with 100 milliliters of cold water.

The washed product is dried by being subjected to subatmospheric pressures at 100° C. for 12 hours and the dried product recrystallized from 200 milliliters of toluene. In such a representative preparation, the product melted, with decomposition, at 319–321° C. Elemental analysis showed: C, 47.15 percent; H, 2.70 percent; N, 2.74 percent; and Cl, 41.87 percent; calculated for $C_{39}H_{26}Cl_{12}N_2O_4$, C, 46.28 percent; H, 2.59 percent; N, 2.77 percent; and Cl, 42.04 percent.

EXAMPLE 6

N-(o-nitrophenyl)-1,2,3,4,9,9-hexachloro - 1,4,4a,5,6,7,8,8a - octahydro-1,4-methanonaphthalene-6,7-dicarboximide 1,2,3,4,9,9-hexachloro-1,4,4a,5,6,7,8,8a-octahydro - 1,4-methanonaphthalene-6,7-dicarboxylic anhydride (21.2 grams; 0.05 mole), o-nitroaniline (6.91 grams; 0.05 mole), and 50 milliliters of dimethylformamide are mixed together to obtain a reaction mixture. The reaction mixture is heated to reflux temperature of about 152–153° C., and found under this circumstance to be a clear solution. The reaction mixture is maintained at reflux temperature for 4 hours, cooled to room temperature, and diluted with 400 milliliters of ice and water at a temperature of about 0° C. to obtain a reaction mixture containing the N-(o-nitrophenyl) - 1,2,3,4,9,9-hexachloro-1,4,4a,5,6,7,8, 8a-octahydro-1,4-methanonaphthalene - 6,7 - dicarboximide product as a white precipitate therein. The reaction mixture containing this product precipitate is permitted to stand for 12 hours and the product precipitate separated from the reaction mixture by suction filtration. The separated product is washed with 100 milliliters of cold water and thereafter dried by being subjected to subatmospheric pressure at 100° C. for 16 hours. The dried product is purified by recrystallization from 400 milliliters of toluene. In a representative preparation in accordance with these procedures, the produce obtained was found to soften at 260° C., and to melt at 309–311° C. Elemental analysis showed: C, 42.32 percent; H, 2.13 percent; N, 5.14 percent; and Cl, 39.46 percent; calculated for $C_{19}H_{12}Cl_6N_2O_4$, C, 41.87 percent; H, 2.22 percent; N, 5.14 percent; and Cl, 39.03 percent.

EXAMPLE 7

Calcium 7-(morpholinocarbonyl)-1,2,3,4,9,9-hexachloro-1,4,4a,5,6,7,8,8a-octahydro-1,4 - methanonaphthalene-6-carboxylate 7-(morpholinocarbonyl)-1,2,3,4,9,9 - hexachloro - 1,4, 4a,5,6,7,8,8a-octahydro-1,4-methanonaphthalene - 8 - carboxylic acid (51.2 grams; 1.0 mole) is mixed with calcium carbonate (50.0 grams; 0.5 mole) and 100 milliliters of aqueous ethanol to prepare a reaction mixture. This reaction mixture is held at room temperature for a period of about 1 hour to obtain the calcium 7-(morpholinocarbonyl)-1,2,3,4,9,9-hexachloro - 1,4,4a,5,6,7,8,8a - octahydro-1,4-methanonaphthalene-6-carboxylate product in the reaction mixture. This product has a molecular weight of 1062.2 and the following structural formula

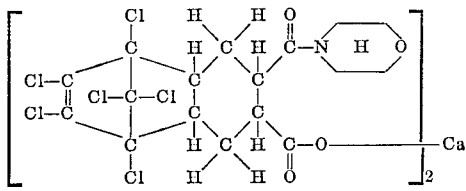

EXAMPLE 8

1,2,3,4,9,9-hexachloro-1,4,4a,5,6,7,8,8a - octahydro - 1,4-methanonaphthalene-6,7-dicarboximide 1,2,3,4,9,9-hexachloro-1,4,4a,5,6,7,8,8a-octahydro - 1,4-methanonaphthalene - 6,7 - dicarboxylic anhydride (21.2 grams; 0.05 mole) is mixed with 100 milliliters of dimethylformamide at room temperature. Thereafter, ammonium carbonate monohydrate (5.7 grams; 0.05 mole) is added to the mixture; the addition is carried out portionwise over a period of time. Gas evolution occurs during the addition.

Following the completion of the addition, the resulting reaction mixture is allowed to stand at room temperature for two hours, at which time gas evolution has approximately terminated. Thereafter, the reaction mixture is heated to reflux, a temperature of about 153° C., and refluxed for 4 hours. Following this period, the reaction mixture is permitted to cool to room temperature, the cooled reaction mixture mixed with 400 milliliters of cold water to precipitate the 1,2,3,4,9,9-hexachloro-1,4,4a,5,6,7,8,8a-octahydro-1,4-methanonaphthalene - 6,7 - dicarboximide product in the reaction mixture, and the resulting mixture containing the precipitated product allowed to stand for a period of 8 hours. Thereafter, the product is separated from the mixture by filtration, the separated product washed with water, and the washed product dried under subatmospheric pressure.

In a representative preparation, the product, upon recrystallization from toluene, was found to melt, with decomposition, at 243–248° C.; the structure was confirmed by infrared spectroscopy.

In view of the foregoing teachings and examples, those skilled in the art will be enabled to prepare all of the products of the present invention. Other representative products are set forth in the following examples:

From 1,2,3,4,9,9-hexachloro-1,4,4a,5,6,7,8,8a - octahydro-1,4-methanonaphthalene-6,7-dicarboxlic acid and 1-carboxyethylamine, 7-((1-carboxyethyl)carbamoyl)-1,2-3,4,9,9-hexachloro-1,4,4a,5,6,7,8,8a-octahydro - 1,4-methanonaphthalene-6 - carboxylic acid having a molecular weight of 514.0.

From 7-(1-carboxyethyl)carbamoyl)-1,2,3,4,9,9-hexachloro-1,4,4a,5,6,7,8,8a-octahydro-1,4 - methanonaphthalene-6 - carboxylic acid and magnesium hydroxide, magnesium 7-((1-carboxyethyl)carbamoyl)-1,2,3,4,9,9-hexachloro-1,4,4a,5,6,7,8,8a-octahydro-1,4 - methanonphthalene-6-carboxylate product having a molecular weight of 1050.4.

From 7-((1-carboxyethyl)carbamoyl)-1,2,3,4,9,9-hexachloro-1,4,4a,5,6,7,8,8a-octahydro-1,4 - methanonaphthalene-6-carboxylic acid in the presence of acetic anhydride, N-(1-carboxyethyl)-1,2,3,4,9,9-hexachloro - 1,4,4a,5,6,7,8,8a-octahydro-1,4-methanonaphthalene - 6,7 - dicarboximide product melting at 235–236.5° C. Elemental analysis showed: C, 38.67 percent; H, 2.73 percent; N, 3.01 percent; and Cl, 42.54 percent; calculated for $C_{16}H_{13}Cl_6NO_4$, C, 38.74 percent; H, 2.64 percent; N, 2.82 percent; and Cl, 42.89 percent.

From 7-((1 - carboxyethyl)carbamoyl) - 1,2,3,4,9,9-hexachloro - 1,4,4a,5,6,7,8,8a - octahydro - 1,4 - methanonaphthalene - 6 - carboxylic acid and 1 - carboxyethylamine, 7 - ((1 - carboxyethyl)carbamoyl) - 1,2,3,4,9,9-hexachloro-1,4,4a,5,6,7,8,8a - octahydro - 1,4 - methanonaphthalene-6-carboxylic acid salt with 1-carboxyethylamine having a molecular weight of 531.1.

From 1,2,3,4,9,9 - hexachloro - 1,4,4a,5,6,7,8,8a-octahydro - 1,4 - methanonaphthalene - 6,7 - dicarboxylic acid and 1-carboxy-2-methylpropylamine, 7 - ((1 - carboxy-2-methylpropyl)carbamoyl)-1,2,3,4,9,9-hexachloro - 1,4,4a, 5,6,7,8,8a - octahydro - 1,4 - methanonaphthalene - 6-carboxylic acid having a molecular weight of 542.1.

In another preparation from 1,2,3,4,9,9-hexachloro-1,4, 4a,5,6,7,8,8a - octahydro-1,4-methanonaphthalene - 6,7-dicarboxylic anhydride and 1 - carboxy-2-methylpropylamine, N-(1 - carboxy - 2 - methylpropyl) - 1,2,3,4,9,9-hexachloro-1,4,4a,5,6,7,8,8a - octahydro - 1,4 - methanonaphthalene - 6,7 - dicarboximide product melting at 246–248° C. Elemental analysis showed: C, 41.45 percent; H, 3.31 percent; N, 2.15 percent; and Cl, 40.22 percent; calculated for $C_{18}H_{17}Cl_6NO_4$, C, 41.25 percent; H, 3.37 percent; N, 2.67 percent; and Cl, 40.59 percent.

From 7-((1 - carboxy - 2 - methylpropyl)carbamoyl)-1,2,3,4,9,9-hexachloro-1,4,4a,5,6,7,8,8a, - octahydro - 1,4-methanonaphthalene - 6 - carboxylic acid and calcium oxide, calcium 7 - ((1-carboxy-2-methylpropyl)carbamoyl) - 1,2,3,4,9,9 - hexachloro - 1,4,4a,5,6,7,8,8a - octohydro - 1,4 - methanonaphthalene - 6 - carboxylate product having a molecular weight of 1102.3.

From 1,2,3,4,9,9 - hexachloro - 1,4,4a,5,6,7,8,8a-octahydro - 1,4 - methanonaphthalene - 6,7 - dicarboxylic anhydride and 1 - carboxy - 3 - methylbutylamine, 7-((1-carboxy - 3 - methylbutyl)carbamoyl) - 1,2,3,4,9,9-hexachloro - 1,4,4a,5,6,7,8,8a - octahydro - 1,4 - methanonaphthalene - 6 - carboxylic acid having a molecular weight of 556.1.

From 7 - ((1 - carboxy - 3 - methylbutyl)carbamoyl)-1,2,3,4,9,9 - hexachloro - 1,4,4a,5,6,7,8,8a - octahydro-1,4-methanonaphthalene-6-carboxylic acid, upon subjection to temperatures of about 90–110° C., N-(1-carboxy-3-methylbutyl) - 1,2,3,4,9,9-hexachloro-1,4,4a,5,6,7,8,8a-octahydro - 1,4 - methanonaphthalene - 6,7 - dicarboximide product melting at 284–285° C. Elemental analysis showed: C, 42.44 percent; H, 3.57 percent; N, 2.66 percent; and Cl, 39.35 percent; calculated for $C_{19}H_{19}Cl_6NO_4$, C, 42.41 percent; H, 3.56 percent; N, 2.60 percent; and Cl, 39.54 percent.

From 1,2,3,4,9,9 - hexachloro - 1,4,4a,5,6,7,8,8a-octahydro - 1,4 - methanonaphthalene - 6,7 - dicarboxylic anhydride and 1-carboxy-2-methylbutylamine, N-(1-carboxy-2-methylbutyl)-1,2,3,4,9,9-hexachloro-1,4,4a,5,6,7,8,8a-octahydro-1,4-methanonaphthalene-6,7-dicarboximide product melting at 260–261° C. Elemental analysis showed: C, 42.35 percent; H, 3.51 percent; N, 2.42 percent; and Cl, 39.24 percent; calculated for $C_{19}H_{19}Cl_6NO_4$, C, 42.41 percent; H, 3.56 percent; N, 2.60 percent; and Cl, 39.54 percent.

From 1,2,3,4,9,9-hexachloro-1,4,4a,5,6,7,8,8a-octahydro-1,4-methanonaphthalene-6,7-dicarboxylic anhydride and 3-carboxypropylamine, 7-((3-carboxypropyl)carbamoyl)-1,2,3,4,9,9-hexachloro-1,4,4a,5,6,7,8,8a-octahydro-1,4-methanonaphthalene-6-carboxylic acid product having a molecular weight of 528.1.

From 7-((3-carboxypropyl)carbamoyl)-1,2,3,4,9,9-hexachloro-1,4,4a,5,6,7,8,8a-octahydro-1,4-methanonaphthalene-6-carboxylic acid and strontium carbonate, strontium 7-((3-carboxypropyl)carbamoyl)-1,2,3,4,9,9-hexachloro-1,4,4a,5,6,7,8,8a-octahydro-1,4-methanonaphthalene-6-carboxylate product having a molecular weight of 1141.7.

From 1,2,3,4,9,9-hexachloro-1,4,4a,5,6,7,8,8a-octahydro-1,4-methanonaphthalene-6,7-dicarboxylic anhydride and 3-carboxypropylamine, N-(3-carboxypropyl)-1,2,3,4,9,9-hexachloro-1,4,4a,5,6,7,8,8a-octahydro-1,4-methanonaphthalene-6,7-dicarboximide product melting at 158–160° C. Elemental analysis showed: C, 40.55 percent; H, 3.02 percent; N, 2.72 percent; and Cl, 41.85 percent; calculated for $C_{17}H_{15}Cl_6NO_4$, C, 40.03 percent; H, 2.96 percent; N, 2.75 percent; and Cl, 41.71 percent.

From 1,2,3,4,9,9-hexachloro-1,4,4a,5,6,7,8,8a-octahydro-1,4-methanonaphthalene-6,7-dicarboxylic anhydride and 1,3-dicarboxypropylamine, N-(1,3-dicarboxypropyl)-1,2,3,4,9,9-hexachloro-1,4,4a,5,6,7,8,8a-octahydro-1,4-methanonaphthalene-6,7-dicarboximide product melting at 250–252° C. Elemental analysis showed: C, 39.33 percent; H, 3.73 percent; N, 3.85 percent; and Cl, 34.18 percent; calculated for $C_{18}H_{15}Cl_6NO_6$, C, 39.02 percent; H, 2.73 percent; N, 2.53 percent; and Cl, 38.40 percent.

From 1,2,3,4,9,9-hexachloro-1,4,4a,5,6,7,8,8a-octahydro-1,4-methanonaphthalene-6,7-dicarboxylic anhydride and 1,1-dicarboxymethylamine, 7-((1,1-dicarboxymethyl)carbamoyl)-1,2,3,4,9,9-hexachloro-1,4,4a,5,6,7,8,8a-octahydro-1,4-methanonaphthalene-6-carboxylic acid product having a molecular weight of 544.0.

From 1,2,3,4,9,9-hexachloro-1,4,4a,5,6,7,8,8a-octahydro-1,4-methanonaphthalene-6,7-dicarboxylic anhydride and 1-(carboxymethyl)-4-carboxybutylamine, N-(1-(carboxymethyl)-4-carboxybutyl)-1,2,3,4,9,9-hexachloro-1,4,4a,5,6,7,8,8a-octahydro-1,4-methanonaphthalene-6,7-dicarboximide product having a molecular weight of 582.1.

From 1,2,3,4,9,9-hexachloro-1,4,4a,5,6,7,8,8a-octahydro-1,4-methanonaphthalene-6,7-dicarboxylic anhydride and 1-carboxyphenethylamine, 7-((1-carboxyphenethyl)carbamoyl)-1,2,3,4,9,9-hexachloro-1,4,4a,5,6,7,8,8a-octahydro-1,4-methanonaphthalene-6-carboxylic acid product having a molecular weight of 590.1. This product, in the presence of dehydrating agent, yields the corresponding N-(1-carboxyphenethyl)-1,2,3,4,9,9-hexachloro-1,4,4a,5,6,7,8,8a-octahydro-1,4-methanonaphthalene-6,7-dicarboximide product melting at 278–279.5° C. Elemental analysis showed: C, 45.90 percent; H, 2.86 percent; N, 2.29 percent; and Cl, 36.80 percent; calculated for $C_{22}H_{17}Cl_6NO_4$, C, 46.18 percent; H, 2.99 percent; N, 2.45 percent; and Cl, 37.19 percent.

From 1,2,3,4,9,9-hexachloro-1,4,4a,5,6,7,8,8a-octahydro-1,4-methanonaphthalene-6,7-dicarboxylic anhydride and 4-carboxy-3-phenylbutylamine, 7-((4-carboxy-3-phenylbutyl)carbamoyl)-1,2,3,4,9,9-hexachloro-1,4,4a,5,6,7,8,8a-octahydro-1,4-methanonaphthalene-6-carboxylic acid product having a molecular weight of 618.2.

From 1,2,3,4,9,9-hexachloro-1,4,4a,5,6,7,8,8a-octahydro-1,4-methanonaphthalene-6,7-dicarboxylic anhydride and cyclohexylamine, 7-(cyclohexylcarbamoyl)-hexachloro-6-carboxylic acid salt with cyclohexylamine, having a molecular weight of 623.3. This product, under acid conditions, yields the corresponding N-cyclohexyl-1,2,3,4,9,9-hexachloro-1,4,4a,5,6,7,8,8a-octahydro-1,4-methanonaphthalene-6,7-dicarboximide product, which melts at 210–213° C. Elemental analysis showed: C, 45.24 percent; H, 3.61 percent; N, 2.78 percent; and Cl, 41.88 percent; calculated for $C_{19}H_{19}Cl_6NO_2$, C, 45.08 percent; H, 3.78 percent; N, 2.76 percent; and Cl, 42.00 percent.

From 1,2,3,4,9,9-hexachloro-1,4,4a,5,6,7,8,8a-octahydro-1,4-methanonaphthalene-6,7-dicarboxylic anhydride and aniline, 7-(phenylcarbamoyl)-1,2,3,4,9,9-hexachloro-1,4,4a,5,6,7,8,8a-octahydro-1,4-methanonaphthalene-6-carboxylic acid product having a molecular weight of 518.1. This product is reacted with barium oxide to yield the corresponding barium 7-(phenylcarbamoyl)-1,2,3,4,9,9-hexachloro-1,4,4a,5,6,7,8,8a-octahydro-1,4-methanonaphthalene-6-carboxylate product, which has a molecular weight of 1143.3.

From 1,2,3,4,9,9-hexachloro-1,4,4a,5,6,7,8,8a-octahydro-1,4-methanonaphthalene-6,7-dicarboxylic anhydride and p-chloroaniline, 7-((p-chlorophenyl)carbamoyl)-1,2,3,4,9,9-hexachloro-1,4,4a,5,6,7,8,8a-octahydro-1,4-methanonaphthalene-6-carboxylic acid product having a molecular weight of 552.5. This product, in the presence of dehydrating agent, yields the corresponding N-(p-chlorophenyl)-1,2,3,4,9,9-hexachloro-1,4,4a,5,6,7,8,8a-octahydro-1,4-methanonaphthalene-6,7-dicarboximide product melting at 180–182° C. Elemental analysis showed: C, 43.00 percent; calculated for $C_{19}H_{12}Cl_7NO_2$, C, 42.69 percent; percent; calculated for $C_{10}H_{12}Cl_7NO_2$, C, 42.69 percent; H, 2.26 percent; N, 2.62 percent; and Cl, 46.43 percent.

From 1,2,3,4,9,9-hexachloro-1,4,4a,5,6,7,8,8a-octahydro-1,4-methanonaphthalene-6,7-dicarboxylic anhydride and p-bromoaniline, N-(p-bromophenyl)-1,2,3,4,9,9-hexachloro-1,4,4a,5,6,7,8,8a-octahydro-1,4-methanonaphthalene-6,7-dicarboximide product melting at 203–205° C. Elemental analysis showed: C, 39.95 percent; H, 2.08 percent; N, 2.32 percent; Cl; 36.75 percent; and Br, 13.63 percent; calculated for $C_{19}H_{12}BrCl_6NO_2$, C, 39.42 percent; H, 2.08 percent; N, 2.41 percent; Cl, 36.74 percent and Br, 13.80 percent.

From 1,2,3,4,9,9-hexachloro-1,4,4a,5,6,7,8,8a-octahydro-1,4-methanonaphthalene-6,7-dicarboxylic anhydride and p-nitroaniline, N-(p-nitrophenyl)-1,2,3,4,9,9-hexachloro-1,4,4a,5,6,7,8,8a-octahydro-1,4-methanonaphthalene-6,7-dicarboximide product melting at 275–278° C. Elemental analysis showed: C, 42.32 percent; H, 2.20 percent; N, 4.94 percent; and Cl, 39.11 percent; calculated for $C_{19}H_{12}Cl_6N_2O_4$, C, 41.87 percent; H, 2.22 percent; N, 5.14 percent; and Cl, 39.03 percent.

From 1,2,3,4,9,9-hexachloro-1,4,4a,5,6,7,8,8a-octahydro-1,4-methanonaphthalene-6,7-dicarboxylic anhydride and 4-chloro-2-nitroaniline, N-(4-chloro-2-nitrophenyl)-1,2,3,4,9,9-hexachloro-1,4,4a,5,6,7,8,8a-octahydro-1,4-methanonaphthalene-6,7-dicarboximide product melting, with decomposition, at 323–325° C. Elemental analysis showed: C, 40.35 percent; H, 1.93 percent; N, 4.99 percent; and Cl, 42.94 percent; calculated for $C_{19}H_{11}Cl_7N_2O_4$, C, 39.38 percent; H, 1.91 percent; N, 4.83 percent; and Cl, 42.83 percent.

From 1,2,3,4,9,9-hexachloro-1,4,4a,5,6,7,8,8a-octahydro-1,4-methanonaphthalene-6,7-dicarboxylic anhydride and 2-chloro-4-nitroaniline, 7-((2-chloro-4-nitrophenyl)carbamoyl)-1,2,3,4,9,9-hexachloro-1,4,4a,5,6,7,8,8a-octahydro-1,4-methanonaphthalene-6-carboxylic acid salt with 2-chloro- 4-nitroaniline, having molecular weight of 770.1. This product is reacted with acetic acid to yield the corresponding N - (2 - chloro - 4 - nitrophenyl) - 1,2,3,4,9,9-hexachloro - 1,4,4a,5,6,7,8,8a - octahydro - 1,4 - methanonaphthalene - 6,7 - dicarboximide product melting at 261–265° C. Elemental analysis showed: C, 39.78 percent; H, 2.04 percent; N, 4.98 percent; and Cl, 42.52 percent; calculated for $C_{19}H_{11}Cl_7N_2O_4$, C, 39.38 percent; H, 1.91 percent; N, 4.83 percent; and Cl, 42.83 percent.

From 1,2,3,4,9,9 - hexachloro - 1,4,4a,5,6,7,8,8a-octahydro - 1,4 - methanonaphthalene - 6,7 - dicarboxylic anhydride and 2 - phenylhydrazine, 7 - (anilinocarbamoyl) - 1,2,3,4,9,9 - hexachloro - 1,4,4a,5,6,7,8,8a-octahydro - 1,4 - methanonaphthalene - 6 - carboxylic acid product having a molecular weight of 533.1.

From 1,2,3,4,9,9 - hexachloro - 1,4,4a,5,6,7,8,8a-octahydro - 1,4 - methanonaphthalene - 6,7 - dicarboxylic anhydride and 2 - (2,4 - dinitrophenyl)hydrazine, N - (2,4 - dinitroanilino) - 1,2,3,4,9,9 - hexachloro - 1, 4,4a,5,6,7,8,8a - octahydro - 1,4 - methanonaphthalene-6,7 - dicarboximide product melting at 312–313° C. Elemental analysis showed: C, 38.34 percent; H, 2.62 percent; N, 9.02 percent; and Cl, 34.66 percent; calculated for $C_{19}H_{12}Cl_6N_4O_6$, C, 37.71 percent; H, 2.00 percent; N, 9.26 percent; and Cl, 35.16 percent.

From 1,2,3,4,9,9 - hexachloro - 1,4,4a,5,6,7,8,8a-octahydro - 1,4 - methanonaphthalene - 6,7 - dicarboxylic anhydride and 2 - (p - chlorophenyl)hydrazine, 7-((p - chloroanilino)carbamoyl) - 1,2,3,4,9,9-hexachloro-1,4,4a,5,6,7,8,8a - octahydro - 1,4 - methanonaphthalene-6 - carboxylic acid product having a molecular weight of 567.5.

From 1,2,3,4,9,9-hexachloro-1,4,4a,5,6,7,8,8a - octahydro-1,4-methanonaphthalene-6,7 - dicarboxylic anhydride and 2-(p-bromophenyl)hydrazine, 7 - ((p - bromoanilino) carbamoyl) - 1,2,3,4,9,9 - hexachloro - 1,4,4a,5,6,7,8,8a-octahydro - 1,4 - methanonaphthalene - 6 - carboxylic acid salt with 2-(p-bromophenyl)hydrazine, having a molecular weight of 799.1.

From 1,2,3,4,9,9 - hexachloro - 1,4,4a,5,6,7,8,8a - octahydro - 1,4 - methanonaphthalene - 6,7 - dicarboxylic anhydride and 2 - (diethylamino)ethylamine, 7 - ((2 - (diethylamino)ethyl)carbamoyl) - 1,2,3,4,9,9 - hexachloro-1,4,4a,5,6,7,8,8a - octahydro - 1,4 - methanonaphthalene-6-carboxylic acid product having a molecular weight of 541.2. This product, upon treatment with sodium hydroxide, yields sodium 7 - ((2 - (diethylamino)ethyl)carbamoyl)-1,2,3,4,9,9 - hexachloro - 1,4,4a,5,6,7,8,8a - octahydro-1,4-methanonaphthalene-6 - carboxylate product having a molecular weight of 563.1.

From 1,2,3,4,0,0 - hexachloro - 1,4,4a,5,6,7,8,8a -octahydro - 1,4 - methanonaphthalene - 6,7 - dicarboxylic anhydride and 2-(diethylamino)ethylamine, N-(2 - (diethylamino)ethyl) - 1,2,3,4,9,9 - hexachloro - 1,4,4a,5,6,7,8,8a-octahydro - 1,4 - methanonaphthalene - 6,7 - dicarboximide product melting at 183–184° C. Elemental analysis showed: C, 43.56 percent; H, 3.80 percent; N, 5.16 percent; and Cl, 40.54 percent; calculated for $C_{19}H_{24}Cl_6N_2O_2$, C, 43.62 percent; H, 4.24 percent; N, 6.36 percent; and Cl, 40.67 percent.

From 1,2,3,4,9,9 - hexachloro - 1,4,4a,5,6,7,8,8a -octahydro - 1,4 - methanonaphthalene - 6,7 - dicarboxylic anhydride and 3 - (diethylamino)propylamine, 7 - ((3 - (diethylamino)propyl)carbamoyl) - 1,2,3,4,9,9 - hexachloro-1,4,4a,5,6,7,8,8a - octahydro - 1,4 - methanonaphthalene-6-carboxylic acid product having a molecular weight of 555.2.

From 7 - ((3 - (diethylamino)propyl)carbamoyl)-1,2,3,4,9,9 - hexachloro - 1,4,4a,5,6,7,8,8a - octahydro-1,4-methanonaphthalene - 6 - carboxylic acid, by subjection to temperatures of 90–110° C., N-(3-(diethylamino)propyl) - 1,2,3,4,9,9 - hexachloro - 1,4,4a,5,6,7,8,8a - octahydro - 1,4 - methanonaphthalene - 6,7 - dicarboximide product having a molecular weight of 537.2.

From 1,2,3,4,9,9 - hexachloro - 1,4,4a,5,6,7,8,8a - octahydro - 1,4 - methanonaphthalene - 6,7 - dicarboxylic anhydride and 3 - (diisopropylamino) - 1 - methylpropylamine, 7-((3 - diisopropylamino) - 1 - methylpropyl)carbamoyl) - 1,2,3,4,9,9 - hexachloro - 1,4,4a,5,6,7,8,8a - octahydro - 1,4 - methanonaphthalene - 6 - carboxylic acid having a molecular weight of 597.3. Upon reaction with a dehydrating agent, this product yields N-(3-(diisopropylamino) - 1 - methylpropyl) - 1,2,3,4,9,9 - hexachloro-1,4,4a,5,6,7,8,8a - octahydro - 1,4 - methanonaphthalene-6,7 - dicarboximide product having a molecular weight of 579.3.

From 1,2,3,4,9,9 - hexachloro - 1,4,4a,5,6,7,8,8a - octahydro - 1,4 - methanonaphthalene - 6,7-dicarboxylic anhydride and 2 - pyridylamine, 7 - (2 - pyridylcarbamoyl)-1,2,3,4,9,9-hexachloro - 1,4,4a,5,6,7,8,8a - octahydro - 1,4-methanonaphthalene - 6 - carboxylic acid product having a molecular weight of 519.1. Upon heating, this product yields the corresponding N-2-pyridyl - 1,2,3,4,9,9 - hexachloro - 1,4,4a,5,6,7,8,8a - octahydro - 1,4 - methanonaphthalene - 6,7 - dicarboximide melting at 130–135° C. Elemental analysis showed: C, 43.99 percent; H, 2.68 percent; N, 5.00 percent; and Cl, 40.65 percent; calculated for $C_{18}H_{12}Cl_6N_2O_2$, C, 43.15 percent; H, 2.41 percent; N, 5.59 percent; and Cl, 42.46 percent.

From 1,2,3,4,9,9 - hexachloro - 1,4,4a,5,6,7,8,8a - octahydro - 1,4 - methanonaphthalene - 6,7 - dicarboxylic anhydride and 5 - aminotetrazole, N - (1H - tetrazol - 5-ylcarbamoyl) - 1,2,3,4,9,9 - hexachloro - 1,4,4a,5,6,7,8,8a-octahydro - 1,4 - methanonaphthalene - 6 - carboxylic acid product having a molecular weight of 510.0. Upon heating, this product yields the corresponding N-(1H-tetrazol-5-yl)-1,2,3,4,9,9 - hexachloro - 1,4,4a,5,6,7,8,8a - octahydro-1,4 - methanonaphthalene - 6,7 - dicarboximide, which melts at 120–130° C. Elemental analysis showed: C, 37.15 percent; H, 2.95 percent; N, 9.10 percent; and Cl, 40.92 percent; calculated for $C_{14}H_9Cl_6N_5O_2$, C, 34.17 percent; H, 1.82 percent; N, 14.23 percent; and Cl, 43.24 percent.

From 1,2,3,4,9,9 - hexachloro - 1,4,4a,5,6,7,8,8a - octahydro - 1,4 - methanonaphthalene - 6,7 - dicarboxylic anhydride and 1 - ethyl - 5 - amino - 1H - tetrazole, 7 - ((1-ethyl - 1H - tetrazol - 5-yl)carbamoyl) - 1,2,3,4,9,9 - hexachloro - 1,4,4a,5,6,7,8,8a - octahydro - 1,4 - methanonaphthalene - 6 - carboxylic acid product having a molecular weight of 538.1. Upon heating to temperatures of 90–110° C., this product yields the corresponding N-(1 - ethyl - 1H - tetrazol - 5 - yl) - 1,2,3,4,9,9 - hexachloro-1,4,4a,5,6,7,8,8a - octahydro - 1,4 - methanonaphthalene-6,7 - dicarboximide product having a molecular weight of 520.1.

From 1,2,3,4,9,9 - hexachloro - 1,4,4a,5,6,7,8,8a - octahydro - 1,4 - methanonaphthalene - 6,7 - dicarboxylic anhydride and 2 - aminohiazole, 7-(2-thiazolylcarbamoyl)-1,2,3,4,9,9 - hexachloro - 1,4,4a,5,6,7,8,8a - octahydro-1,4-methanonaphthalene - 6 - carboxylic acid product having a molecular weight of 525.1. This product, upon heating, yields the corresponding N - 2 - thiazolyl - 1,2,3,4,9,9-hexachloro-1,4,4a,5,6,7,8,8a - octahydro - 1,4 - methanonaphthalene - 6,7 - dicarboximide product, which, upon recrystallization, melts at 275–280° C. Elemental analysis showed: C, 38.30 percent; H, 2.17 percent; N, 5.64 percent; Cl, 41.71 percent; and S, 5.95 percent; calculated for $C_{16}H_{10}Cl_6N_2O_2S$, C, 37.90 percent; H, 1.99 percent; N, 5.52 percent; Cl, 41.95 percent; and S, 6.32 percent.

From equimolecular proportions of 1,2,3,4,9,9-hexachloro-1,4,4a,5,6,7,8,8a-octahydro - 1,4-methanonaphthalene-6,7-dicarboxylic anhydride and m-phenylenediamine, 7-((m-aminophenyl)carbamoyl) - 1,2,3,4,9,9-hexachloro-1,4,4a,5,6,7,8,8a - octahydro - 1,4 - methanonaphthalene-6-carboxylic acid product having a molecular weight of 533.1. This product, upon treatment with another equimolecular amount of the 1,2,3,4,9,9-hexachloro-1,4,4a,5, 6,7,8,8a-octahydro - 1,4 - methanonaphthalene-6,7-dicarboxylic anhydride, yields the corresponding N,N'-m-phenylenebis - 1,2,3,4,9,9 - hexachloro - 1,4,4a,5,6,7,8,8a-octahydro-1,4-methanonaphthalene - 6,7-dicarboximide product. This product is dimorphic; it melts and resolidifies at 185–190° C., and melts at 328–330° C.

From 1,2,3,4,9,9 - hexachloro - 1,4,4a,5,6,7,8,8a - octahydro-1,4-methanonaphthalene - 6,7 - dicarboxylic anhydride and p-phenylenediamine, N,N'-p-phenylenebis-(1,2,3,4,9,9 - hexachloro - 1,4,4a,5,6,7,8,8a - octahydro - 1,4-methanonaphthalene-6,7-dicarboximide) product melting at about 350° C. Elemental analysis showed: C, 42.00 percent; H, 2.13 percent; N, 3.03 percent; and Cl, 45.97 percent; calculated for $C_{32}H_{20}Cl_{12}N_2O_4$, C, 41.69 percent; H, 2.19 percent; N, 3.04 percent; and Cl, 46.15 percent.

From 1,2,3,4,9,9 - hexachloro - 1,4,4a,5,6,7,8,8a - octahydro-1,4-methanonaphthalene - 6,7 - dicarboxylic anhydride and 1,6-hexanediamine, 7-((6-aminohexyl)carbamoyl)-1,2,3,4,9,9 - hexachloro - 1,4,4a,5,6,7,8,8a - octahydro-1,4-methanonaphthalene - 6 - carboxylic acid product having a molecular weight of 541.2. This product, upon reaction with calcium hydroxide, yields the corresponding calcium 7-((6-aminohexyl)carbamoyl)-1,2,3,4,9,9-hexachloro - 1,4,4a,5,6,7,8,8a-octahydro-1,4-methanonaphthalene-6-carboxylate product having a molecular weight of 1120.4.

From 1,2,3,4,9,9 - hexachloro - 1,4,4a,5,6,7,8,8a - octahydro- 1,4-methanonaphthalene - 6,7 - dicarboxylic anhydride and 1,6-hexanediamine, N,N'-hexylenebis-(1,2,3,4,9,9 - hexachloro - 1,4,4a,5,6,7,8,8a - octahydro-1,4-methanonaphthalene-6,7-dicarboximide) product melting at 190–195° C. Elemental analysis showed: C, 42.02 percent; H, 3.25 percent; N, 2.99 percent; and Cl, 45.25 percent; calculated for $C_{32}H_{28}Cl_{12}N_2O_4$, C, 41.33 percent; H, 3.04 percent; N, 3.02 percent; and Cl, 45.75 percent.

From 1,2,3,4,9,9 - hexachloro - 1,4,4a,5,6,7,8,8a - octahydro-1,4-methanonaphthalene - 6,7 - dicarboxylic anhydride and ethylenediamine, 7-((2-aminoethyl)carbamoyl)-1,2,3,4,9,9 - hexachloro - 1,4,4a,5,6,7,8,8a - octahydro-1,4-methanonaphthalene-6-carboxylic acid product having a molecular weight of 485.1.

From 1,2,3,4,9,9 - hexachloro - 1,4,4a,5,6,7,8,8a - octahydro - 1,4 - methanonaphthalene - 6,7 - dicarboxylic anhydride and 2,5-dimethyl - 1,7 - heptanediamine, 7-((7-amino - 2,5 - dimethylheptyl)carbamoyl)-1,2,3,4,9,9-hexachloro - 1,4,4a,5,6,7,8,8a - octahydro - 1,4 - methanonaphthalene-6-carboxylic acid product having a molecular weight of 583.2.

From equimolecular proportions of 1,2,3,4,9,9-hexachloro - 1,4,4a,5,6,7,8,8a - octahydro - 1,4 - methanonaphthalene-6,7-dicarboxylic anhydride and p,p'-methylenebisaniline, 7-((p-(p-aminobenzyl)phenyl)carbamoyl) - 1,2,3,4,9,9-hexachloro-1,4,4a,5,6,7,8,8a - octahydro - 1,4-methanonaphthalene-6-carboxylic acid product having a molecular weight of 632.2.

From 1,2,3,4,9,9 - hexachloro - 1,4,4a,5,6,7,8,8a - octahydro - 1,4 - methanonaphthalene - 6,7 - dicarboxylic anhydride and p,p'-oxydianiline, 7-((p-(p-aminophenoxy)-phenyl)carbamoyl) - 1,2,3,4,9,9 - hexachloro - 1,4,4a,5,6,7,8,8a - octahydro - 1,4 - methanonaphthalene-6-carboxylic acid product having a molecular weight of 625.2.

From 1,2,3,4,9,9 - hexachloro - 1,4,4a,5,6,7,8,8a - octahydro - 1,4 - methanonaphthalene - 6,7 - dicarboxylic anhydride and pp'-oxydianiline, N,N'-oxybis(p-phenylene)-bis(1,2,3,4,9,9 - hexachloro - 1,4,4a,5,6,7,8,8a-octahydro-1,4-methanonaphthalene-6,7-dicarboximide) product having a molecular weight of 1014.1.

From 1,2,3,4,9,9 - hexachloro - 1,4,4a,5,6,7,8,8a - octahydro - 1,4 - methanonaphthalene - 6,7 - dicarboxylic anhydride and p,p'-thiodianiline, N,N'-thiobis(p-phenylene)-bis(1,2,3,4,9,9 - hexachloro - 1,4,4a,5,6,7,8,8a - octahydro-1,4 - methanonaphthalene - 6,7 - dicarboximide) product having a molecular weight of 1030.2.

From 12,3,4,9,9 - hexachloro - 1,4,4a,5,6,7,8,8a - octahydro - 1,4 - methanonaphthalene - 6,7 - dicarboxylic anhydride and p,p'-(dimethylmethylene)dianiline, 7-((p-(p-amino - α,α - dimethylbenzyl)phenyl)carbamoyl) - 1,2,3,4,9,9 - hexachloro - 1,4,4a,5,6,7,8,8a - octahydro - 1,4,-methanonaphthalene-6-carboxylic acid product having a molecular weight of 651.3. Upon treatment with potassium hydroxide, this product yields the corresponding potassium 7-((p-(p-amino - α,α - dimethylbenzyl)phenyl) carbamoyl) - 1,2,3,4,9,9 - hexachloro - 1,4,4a,5,6,7,7,8a-octahydro-1,4-methanonaphthalene-6-carboxylate product having a molecular weight of 689.3.

From 1,2,3,4,9,9 -hexachloro - 1,4,4a,5,6,7,8,8a - octahydro - 1,4 - methanonaphthalene - 6,7 - dicarboxylic anhydride and p,p' - (dimethylmethylmethylene)dianiline, N,N' - (dimethylmethylene)bis(p - phenylene)bis(1,2,3,4,9 - hexachloro - 1,4,4a,5,6,7,8,8a - octahydro - 2,4-methanonaphthalene-6,7-dicarboximide) product having a molecular weight of 1040.2.

From 1,2,3,4,9,9 - hexachloro - 1,4,4a,5,6,7,8,8a - octahydro - 1,4 - methanonaphthalene - 6,7 - dicarboxylic anhydride and piperidine, 7-(piperidinocarbonyl)-1,2,3,4,9,9-hexachloro - 1,4,4a,5,6,7,8,8a - octahydro-1,4-methanonaphthalene-6-carboxylic acid product melting at 207–210° C. Elemental analysis showed: C, 39.13 percent; H, 3.40 percent; N, 2.73 percent; and Cl, 44.61 percent; calculated for $C_{18}H_{19}Cl_6NO_3$, C, 42.38 percent; H, 3.75 percent; N, 2.75 percent; and Cl, 41.70 percent. Upon treatment of this product with magnesium hydroxide, the corresponding magnesium 7-(piperidinocarbonyl)-1,2,3,4,9,9 - hexachloro - 1,4,4a,5,6,7,8,8a - octahydro-1,4-methanonaphthalene-6-carboxylate product, having a molecular weight of 1042.5 is produced.

From 1,2,3,4,9,9 - hexachloro - 1,4,4a,5,6,7,8,8a - octahydro - 1,4 - methanonaphthalene - 6,7 - dicarboxylic anhydride and 2,6 - dimethyl piperidine, 7-((2,6 - dimethylpiperidino)carbonyl) - 1,2,3,4,9,9 - hexachloro - 1,4,4a,5,6,7,8,8a - octahydro - 1,4 - methanonaphthalene - 6 - carboxylic acid product melting, with decomposition, at 120° C. Elemental analysis showed: C, 39.13 percent; H, 3.39 percent; N, 2.70 percent; and Cl, 44.61 percent; calculated for $C_{20}H_{23}Cl_6NO_3$, C, 44.63 percent; H, 4.31 percent; N, 2.60 percent; and Cl, 39.70 percent.

From 1,2,3,4,9,9 - hexachloro - 1,4,4a,5,6,7,8,8a-octahydro - 1,4 - methanonaphthalene-6,7-dicarboxylic anhydride and morpholine, 7 - (morpholinocarbonyl)-1,2,3,4,9,9,-hexachloro - 1,4,4a,5,6,7,8,8a - octahydro - 1,4 - methanonaphthalene-6-carboxylic acid salt with morpholine, having a molecular weight of 599.2.

From 1,2,3,4,9,9 - hexachloro - 1,4,4a,5,6,7,8,8a-octahydro - 1,4 - methanonaphthalene-6,7-dicarboxylic anhydride and 2,6-diethyl morpholine, 7-((2,6-diethylmorpholino) carbonyl) - 1,2,3,4,9,9 - hexachloro-1,4,4a,5,6,7,8,8a-octahydro-1,4-methanonaphthalene-6-carboxylic acid product having a molecular weight of 568.2.

From 1,2,3,4,9,9 - hexachloro - 1,4,4a,5,6,7,8,8a-octahydro - 1,4 - methanonaphthalene-6,7-dicarboxylic anhydride and pyrrolidine, 7-(1-pyrrolidinylcarbonyl)-1,2,3,4,9,9-hexachloro - 1,4,4a,5,6,7,8,8a - octahydro - 1,4 - methanonaphthalene-6-carboxylic acid product melting at 213–216° C. Elemental analysis showed: C, 40.00 percent; H, 3.44 percent; N, 2.98 percent; and Cl, 43.84 percent; calculated for $C_{17}H_{17}Cl_6NO_3$, C, 41.16 percent; H, 3.45 percent; N, 2.82 percent; and Cl, 42.88 percent.

From 1,2,3,4,9,9 - hexachloro - 1,4,4a,5,6,7,8,8a-octahydro - 1,4 - methanonaphthalene-6,7-dicarboxylic anhydride and 3-ethylpyrrolidine, 7-((3-ethyl-1-pyrrolidinyl)carbonyl) - 1,2,3,4,9,9 - hexachloro-1,4,4a,5,6,7,8,8a-octahydro-1,4-methanonaphthalene-6-carboxylic acid product having a molecular weight of 524.1.

From 1,2,3,4,9,9 - hexachloro - 1,4,4a,5,6,7,8,8a-octahydro - 1,4 - methanonaphthalene-6,7-dicarboxylic anhydride and 2,2-dimethylpyrrolidine, 7-((2,2-diethyl-1-pyrrolidinyl)carbonyl) - 1,2,3,4,9,9-hexachloro-1,4,4a,5,6,7,8,8a-octahydro - 1,4 - methanonaphthalene - 6 - carboxylic acid product having a molecular weight of 524.1.

The products of the present invention are useful as parasiticides for the control of insects, such as, for example, plum curculio, southern army worm, and American cockroach; as arachnicides for the control of ticks and mites; such as the two-spotted spider mite; molluscacides for the control of molluscs such as the ram's horn snail; as bactericides for the control of bacteria such as soil bacteria and fire blight bacteria; and as fungicides. The products are also useful as herbicides, for example, for the control of *Lycopersicum esculentum* and *Avena fatua*.

In representative procedures, N-2-pyridyl-1,2,3,4,9,9-hexachloro - 1,4,4a,5,6,7,8,8a - octahydro - 1,4 - methanonaphthalene-6,7-dicarboximide was employed as an insecticide for the residual control of southern army worm larvae on plants. In these procedures, a treating composition was prepared containing the specified product as sole active agent. This treating composition was applied to plants to the point of run-off. Thereafter, the treated plants were held for a period of about 1 week, at which time they were infested with known numbers of southern army worm larvae. Six days after the infection, the plants were examined, and there was found a 100 percent kill and control of the southern army worm larvae. One day later, that is, 14 days following the treatment with the treating composition, the plants were again infected with known numbers of southern army worm larvae. Six days later, the plants were examined, and it was found that there was again a 100 percent kill and control of the southern army worm larvae.

The 1,2,3,4,9,9-hexachloro-1,4,4a,5,6,7,8,8a-octahydro-1,4-methanonaphthalene-6,7-dicarboxylic anhydride employed as a starting material in the preparation of the compounds of the present invention is itself prepared in known procedures which comprise the Diels-Alder type reaction of hexachlorocyclopentadiene and tetrahydrophthalic anhydride at a temperature range of 150°–200° C. Preferably the reaction is carried out in an inert liquid reaction media, for example, a hydrocarbon such as heptane, toluene, xylene, or ethylbenzene, or a halogenated hydrocarbon, such as chlorobenzene or dichlorobenzene. The reactants are consumed in equimolecular amounts, and are preferably supplied in such amounts. The desired anhydride is obtained as a precipitate in the reaction mixture; this product precipitate can be separated from the reaction mixture, preferably by filtration, and, if desired, purified, as by recrystallization from a suitable solvent.

What is claimed is:
1. N - (1-carboxyethyl)-1,2,3,4,9,9-hexachloro-1,4,4a,5,6,7,8,8a - octahydro - 1,4 - methanonaphthalene-6,7-dicarboximide.
2. N - (1 - carboxy - 2-methylpropyl)-1,2,3,4,9,9-hexachloro - 1,4,4a,5,6,7,8,8a-octahydro-1,4-methanonaphthalene-6,7-dicarboximide.
3. N - (1-carboxy-3-methylbutyl)-1,2,3,4,9,9-hexachloro - 1,4,4a,5,6,7,8,8a-octahydro-1,4-methanonaphthalene-6,7-dicarboximide.
4. N - (1-carboxy-2-methylbutyl)-1,2,3,4,9,9-hexachloro - 1,4,4a,5,6,7,8,8a-octahydro-1,4-methanonaphthalene-6,7-dicarboximide.
5. N-(3-carboxypropyl)-1,2,3,4,9,9-hexachloro-1,4,4a,5,6,7,8,8a - octahydro-1,4-methanonaphthalene-6,7-dicarboximide.
6. N - (1,3-dicarboxypropyl)-1,2,3,4,9,9-hexachloro-1,4,4a,5,6,7,8,8a - octahydro - 1,4-methanonaphthalene-6,7-dicarboximide.
7. N - (1-carboxyphenethyl)-1,2,3,4,9,9-hexachloro-1,4,4a,5,6,7,8,8a - octahydro - 1,4-methanonaphthalene-6,7-dicarboximide.
8. A compound selected from the group consisting of the N(monocarboxyloweralkyl)-, N(dicarboxyloweralkyl)- and N(phenylmonocarboxyloweralkyl)-1,2,3,4,9,9-hexachloro - 1,4,4a,5,6,7,8,8a - octahydro - 1,4 - methanonaphthalene-6,7-dicarboximides wherein the alkyl groups contain from one to five carbon atoms.

References Cited
UNITED STATES PATENTS
3,280,143  10/1966  Hayes et al. _____ 260—326

ALEX MAZEL, *Primary Examiner.*

JOSE TOVAR, *Assistant Examiner.*

U.S. Cl. X.R.

260—247.2, 294, 295, 294.8, 295.5, 302, 308, 326.3, 514, 501.11, 518, 519, 534, 999